United States Patent
Ryne et al.

(10) Patent No.: US 10,635,102 B2
(45) Date of Patent: *Apr. 28, 2020

(54) DRIVER RE-ENGAGEMENT ASSESSMENT SYSTEM FOR AN AUTONOMOUS VEHICLE

(71) Applicant: STEERING SOLUTIONS IP HOLDING CORPORATION, Saginaw, MI (US)

(72) Inventors: Patrik M. Ryne, Midland, MI (US); Michael R. Story, Bay City, MI (US); Michelle Greb, Macomb, MI (US); Joachim J. Klesing, Rochester, MI (US); Pierre C. Longuemare, Paris (FR); Ayyoub Rezaeian, Troy, MI (US); Harold Li, Shelby Township, MI (US); Robert E. Llaneras, Pulaski, VA (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 269 days.

This patent is subject to a terminal disclaimer.

(21) Appl. No.: 15/785,922

(22) Filed: Oct. 17, 2017

(65) Prior Publication Data

US 2019/0113913 A1     Apr. 18, 2019

(51) Int. Cl.
*G05D 1/00*     (2006.01)
*B60W 50/08*    (2020.01)
(Continued)

(52) U.S. Cl.
CPC .............. *G05D 1/0061* (2013.01); *B60T 7/14* (2013.01); *B60T 7/22* (2013.01); *B60W 50/082* (2013.01);
(Continued)

(58) Field of Classification Search
CPC .............. G05D 1/0061; B60W 50/085; B60W 30/182; B62D 6/008; B62D 15/021; B60T 13/10; B60L 5/002; B60C 11/24
See application file for complete search history.

(56) References Cited

U.S. PATENT DOCUMENTS 6,129,025 A * 10/2000 Minakami ............... B60L 5/005
                                                    104/88.01
6,650,965 B2 * 11/2003 Takagi ................... G06N 3/008
                                                    318/568.12

(Continued)

OTHER PUBLICATIONS

Xue et al., Software architecture for the ECU of automated manual transmission, 2010, IEEE, p. 63-68 (Year: 2010).*

(Continued)

*Primary Examiner* — McDieunel Marc
(74) *Attorney, Agent, or Firm* — Dickinson Wright PLLC

(57) ABSTRACT

A host vehicle includes a driver re-engagement assessment system and an X-by-wire device adapted for both manual control and automated control by an automated guidance system. The driver re-engagement assessment system includes a controller, a user interface, and test execution module and a test evaluation module. The user interface is configured to interface with an occupant and output an occupant directive signal for manual control to the controller. The test execution module initiates an occupant re-engagement test upon receipt of the occupant directive signal by the controller. The test evaluation module is configured to receive an occupant performance signal indicative of occupant performance during the re-engagement test, and evaluate the occupant performance signal to determine a test pass result and a test fail result. The manual control of the host vehicle is assumed by the occupant upon the determination of the test pass result.

19 Claims, 5 Drawing Sheets

(51) Int. Cl.
    *B62D 15/02*     (2006.01)
    *B62D 6/00*     (2006.01)
    *B60T 7/14*     (2006.01)
    *B62D 1/28*     (2006.01)
    *B60T 7/22*     (2006.01)
    *B60T 13/10*     (2006.01)

(52) U.S. Cl.
    CPC .............. *B62D 1/286* (2013.01); *B62D 6/008* (2013.01); *B62D 15/021* (2013.01); *B62D 15/025* (2013.01); *B60T 13/10* (2013.01); *B60T 2201/022* (2013.01); *B60T 2220/00* (2013.01)

(56) References Cited

U.S. PATENT DOCUMENTS

| | | | | |
|---|---|---|---|---|
| 6,718,231 | B2* | 4/2004 | Konno | B25J 9/1671 |
| | | | | 379/88.03 |
| 6,889,118 | B2* | 5/2005 | Murray, IV | B25J 9/161 |
| | | | | 318/568.11 |
| 6,952,629 | B2* | 10/2005 | Takamura | G05D 1/0246 |
| | | | | 250/208.1 |
| 7,299,110 | B2* | 11/2007 | Gupta | G06F 17/27 |
| | | | | 700/246 |
| 7,620,477 | B2* | 11/2009 | Bruemmer | G06N 3/008 |
| | | | | 180/167 |
| 7,668,621 | B2* | 2/2010 | Bruemmer | G05D 1/0088 |
| | | | | 318/568.12 |
| 2005/0046584 | A1* | 3/2005 | Breed | B60C 11/24 |
| | | | | 340/13.31 |
| 2006/0208169 | A1* | 9/2006 | Breed | B60N 2/002 |
| | | | | 250/221 |
| 2017/0305014 | A1* | 10/2017 | Gildert | B25J 9/1664 |
| 2019/0087975 | A1* | 3/2019 | Versace | G06K 9/00664 |
| 2019/0155266 | A1* | 5/2019 | Gildert | G05B 19/42 |
| 2019/0168760 | A1* | 6/2019 | Ryne | B60W 30/182 |
| 2019/0248003 | A1* | 8/2019 | Nagarajan | B25J 9/1612 |

OTHER PUBLICATIONS

Koscher et al., Experimental Security Analysis of a Modern Automobile, 2010, IEEE, p. 447-462 (Year: 2010).*
Johns et al., Exploring shared control in automated driving, 2010, IEEE, p. 91-98 (Year: 2010).*
Lindlar et al., A Search-Based Approach to Functional Hardware-in-the-Loop Testing, 2010, IEEE, p. 111-119 (Year: 2010).*
Bohg et al., Data-Driven Grasp Synthesis—A Survey, 2013, IEEE, p. 289-309 (Year: 2013).*
Bohg et al., Exemplar-based prediction of global object shape from local shape similarity, 2016, IEEE, p. 3398-3405 (Year: 2016).*
Stiefelhagen et al., Enabling Multimodal Human-Robot Interaction for the Karlsruhe Humanoid Robot, 2007, IEEE, p. 840-851 (Year: 2007).*
Song et al., Learning to Detect Visual Grasp Affordance, 2015, IEEE, p. 798-809 (Year: 2015).*
Gu et al., Towards Learning and Evolving of a Team of Sony Legged Robots, 2000, Internet, p. 1-8 (Year: 2000).*
Martens et al., A Friend for Assisting Handicapped People, 2001, p. 57-65 (Year: 2001).*

* cited by examiner

DRIVER RE-ENGAGEMENT ASSESSMENT SYSTEM FOR AN AUTONOMOUS VEHICLE

BACKGROUND

The present disclosure relates to autonomous vehicles, and more particularly, to a driver re-engagement assessment system of the autonomous vehicle.

Autonomous or semi-autonomous vehicles are known to transport occupants between destinations. Typically, such transportation conditions amount to eyes-off and hands-off use by the occupant. In some situations during transport, an occupant may desire vehicle engagement as a driver. For a potential driver to re-engage manual control of the vehicle, current autonomous systems rely on preset voting schemes that may not cover all situations and may be a challenge for a potential driver to understand. Enhancements to driver re-engagement systems that verify a driver's readiness to assume manual control is desirable.

SUMMARY

In one exemplary embodiment of the present disclosure, a driver re-engagement assessment system includes an X-by-wire device adapted for both manual control and automated control of a vehicle. The driver re-engagement assessment system includes a controller, a user interface, a test execution module, and a test evaluation module. The user interface is configured to output an occupant signal for manual control to the controller. The test execution module is executed by an electronic processor of the controller upon controller receipt of the occupant directive signal, and initiates a re-engagement test. The test evaluation module is executed by the electronic processor, and is configured to receive an occupant performance signal indicative of occupant performance during the re-engagement test, and evaluates the occupant performance signal to determine a test pass result and a test fail result. Manual control of the vehicle is enabled upon the determination of the test pass result.

In another exemplary embodiment, a method of operating a driver re-engagement assessment system of an autonomous vehicle includes generating a manual operation directive signal by a user interface in response to an occupant directive. The manual operation directive is received by a controller. A test execution module is then initiated and executed by the controller upon receipt of the manual operation directive signal. A notification signal is sent to the user interface instructing about an impending re-engagement test. A test command signal is then sent by the test execution module to an X-by-wire device. The X-by-wire device performs a function associated with the re-engagement test. An occupant performance signal is then sent to a test evaluation module that is executed by the controller. The occupant performance signal is evaluated by the test evaluation module.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
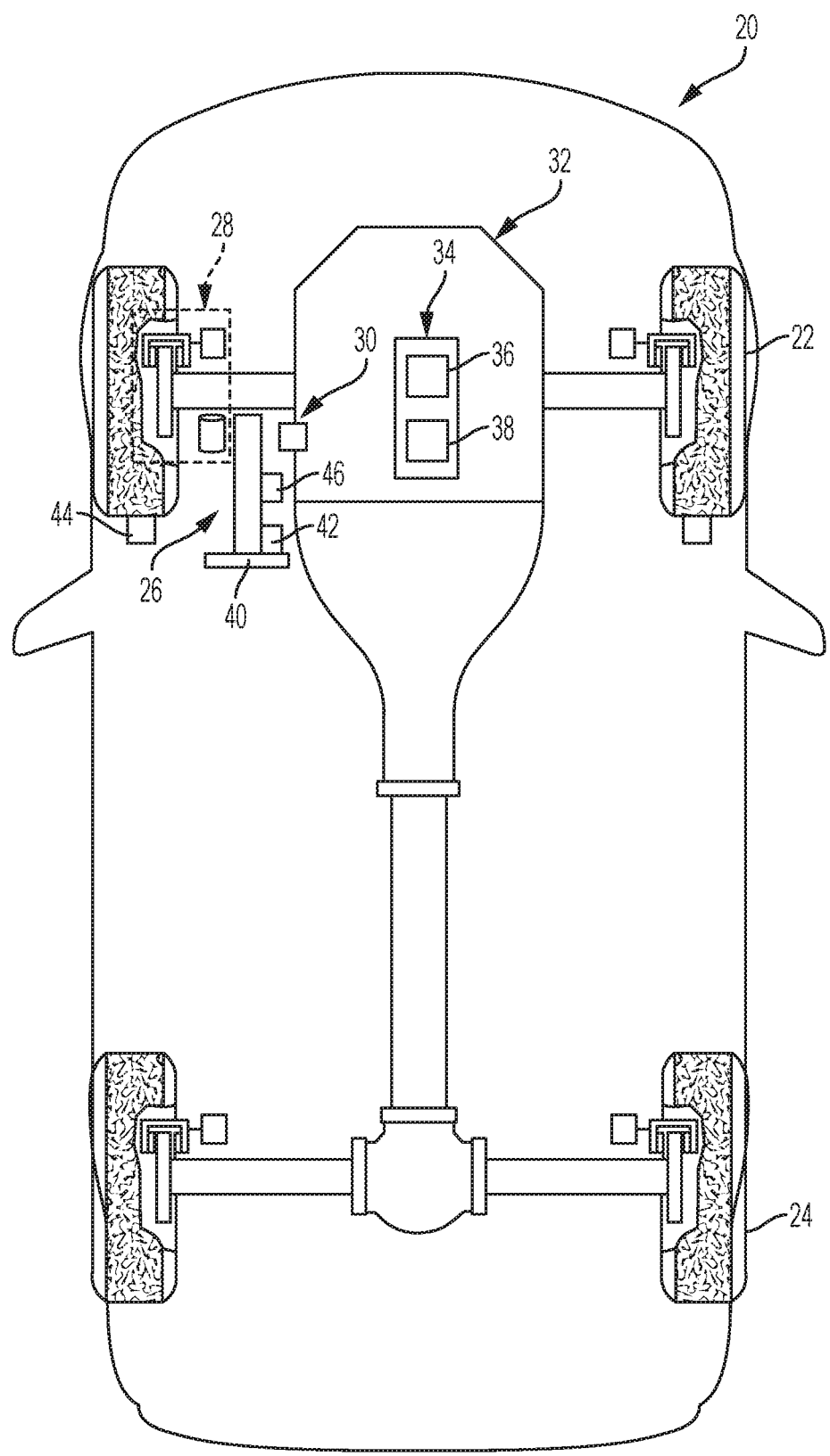
FIG. 1 is a schematic of a host vehicle.

Referring now to the Figures, where the invention will be described with reference to specific embodiments, without limiting same, an autonomous, host, vehicle 20 is illustrated. Referring to FIG. 1, the host vehicle 20 may include forward wheel(s) 22 (e.g., road wheels), rearward wheels 24 (e.g., road wheels), a steering device 26 (e.g., steer-by-wire device), a brake device 28, an acceleration device 30 (e.g., acceleration pedal), a powertrain 32, and an electronic controller 34. The rearward wheel(s) 24 may be driven by the powertrain 32 and the forward wheels 22 may be operatively linked to the steering device 26 for directional maneuvering of the host vehicle 20 as is commonly known to one having skill in the art.

The controller 34 of the host vehicle 20 may include at least one processor 36 and at least one electronic storage medium 38. The processor 36 may be a microprocessor or other control circuitry such as analog and/or digital control circuitry including an application specific integrated circuit (ASIC) for processing data as is known by one with skill in the art. The storage medium 38 of the controller 34 may be non-volatile memory, such as electrically erasable programmable read-only memory (EEPROM) for storing one or more routines, thresholds, and captured data.

The steering device 26 may be linked to the front wheels 24 to direct the vehicle 20 in a desired direction. The steering device 26 may include a steering wheel 40, a steering wheel position sensor 42, a road wheel position sensor 44 (i.e., angular position sensor), a steering torque sensor 46, and other devices and/or sensors capable of providing steering assistance to an occupant when operating in a manual mode, and/or data signals to the automated guidance system 32 when operating in the automated mode.

In one example, the brake device 28 may be a brake-by-wire device with partial hydraulic actuation. Similarly, the steering device 26 may be a steer-by-wire device, and the acceleration device 30 may be an acceleration-by-wire device. Each of the X-by-wire devices 26, 28, 30 may include a part of the controller 34 and/or may include respective software applications stored in the storage medium 38 and executed by the processor 36. Each device 26, 28, 30 may further include other components and or sensors configured to send data signals to the controller 34 and/or receive command signals from the controller 34 to perform specific functions. All three X-by-wire devices 26, 28, 30 may be, and/or are generally known to one having skill in the art.

Figure 2:
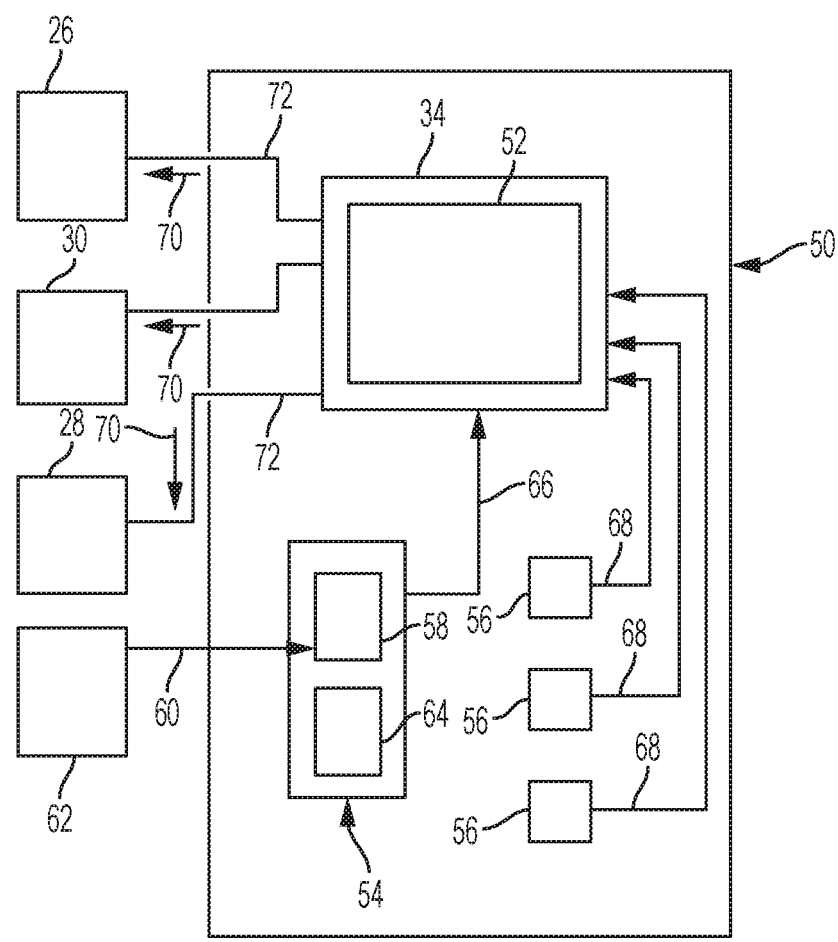
FIG. 2 is a schematic of an automated guidance system of the host vehicle.

Referring to FIG. 2, the host vehicle 20 may further include an automated guidance system 50 generally configured to relieve an occupant of vehicle operation. The controller 34 may be part of, or facilitates operation of, the automated guidance system 40. When the host vehicle 20 is in an automated mode, the automated guidance system 50 may assume control of the steering device 26, the acceleration device 30, the brake device 28, and any other devices that would relieve a vehicle occupant of manual vehicle control. In one embodiment, the automated guidance system 50 may be, at least in-part, a software application stored in the storage medium 38 and executed by the processor 36 of the controller 34.

To operate, the automated guidance system 50 may rely on detectable markers in a roadway so the system can determine where to steer the host vehicle 20 utilizing the controller 34. The automated guidance system 50 may be a vision based system that does not rely on markers, and instead may rely on image processing to guide the host vehicle 20, or may be a combination of both marker systems, vision based systems, and/or other systems.

In one embodiment, the automated guidance system 50 may include a software application or module 52 executed by the controller 34, an occupant interface 54, and a multitude of sensors 56 (i.e., three illustrated). The occupant interface 54 may include an occupant command input device 58 (e.g., microphone) for receiving directives 60 (e.g., destination commands) from an occupant 62 (e.g., passenger), and an occupant directive confirmation device 64 (e.g., speaker) for at least confirming the directive 60 provided by the occupant 62.

The occupant interface 54 is configured to send an electronic signal (see arrow 66) to the controller 34 indicative of the occupant directive 60. In one embodiment, the occupant directive 60 may be audible or verbal commands. In another embodiment, the occupant command input device 52 may be an interactive touch screen or display, and the occupant directives 60 may be entered by the occupant 62 via the touch screen. Yet further, the touch screen may also function, or may include, the occupant command confirmation device 64, wherein confirmations are displayed on the screen.

The multitude of sensors 56 may include sensor(s), or detectors, used to detect surrounding conditions such as roadway conditions, intersections, moving and stationary object, other vehicles, and any other condition necessary to maneuver the host vehicle 20. Other sensors may include those necessary to controllably operate and/or monitor the controller 34 and/or software application 52 executed by the controller 34. Alternatively, such sensors used to facilitate the controller 34 may be an integral part of the controller. In one embodiment, the sensors 56, or portions thereof, may be strategically located on or within the host vehicle 20, and as best suited to enable a particular sensor function while maintaining a degree of unobtrusiveness (i.e., cosmetically pleasing). The sensor(s) 56 may be configured to output an array of signals (see arrows 68) to the controller 34 for processing, and vehicle guidance and/or control.

In one embodiment, one or more of the sensor(s) 56 may be sensors that visualize scenes and/or surrounding terrain conditions and other objects to assist the host vehicle in safe maneuvering. Such sensors may include imaging devices (e.g., cameras), radar, infrared devices, and any other device.

Any one or more of the X-by-wire devices 26, 28, 30 may be configured to receive command signals (see arrows 70) over wired, or wireless pathways 72, and indicative of commands outputted by the controller 34. The command signal(s) 70 are generated by the controller 34 via the processing of any one or more of the occupant directive signal 66, sensor signals 68, and/or other inputs.

Figure 3:
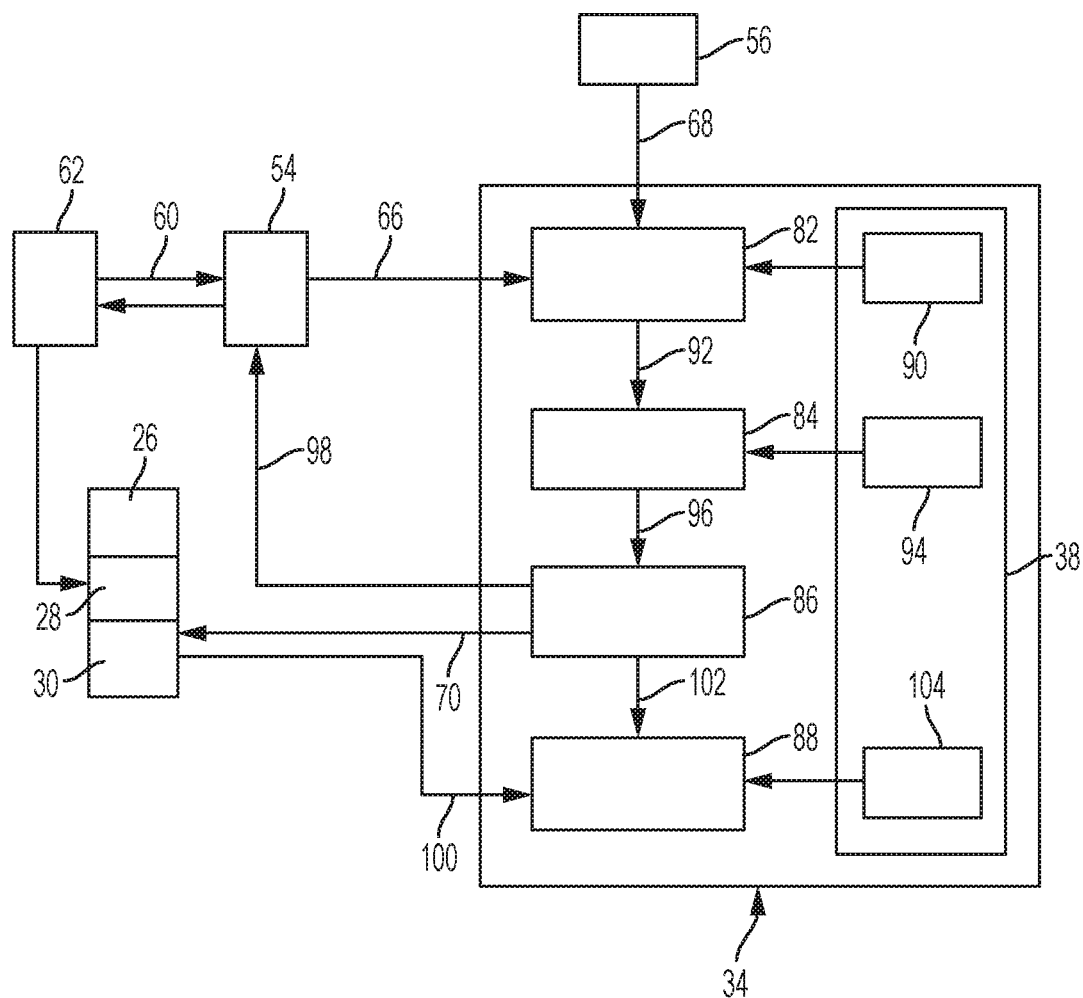
FIG. 3 is a schematic of a driver re-engagement assessment system of the host vehicle.

Referring to FIG. 3, the host vehicle 20 may further include a driver re-engagement assessment system 80 that may be, at least in-part, an integral part of the automated guidance system 50. The driver re-engagement assessment system 80 functions to assess the readiness of the occupant 62 to become an actual driver that performs manual operation/maneuvering of the host vehicle 20. The controller 34 may be part of, or facilitates operation of, the assessment system 80. The assessment system 80 generally becomes activated when the host vehicle 20 is in the automated mode and the occupant requests manual control of the host vehicle 20. At this time, the assessment system 80 initiates a test that the occupant must pass before manual control is turned over to the occupant (i.e., manual mode of vehicle operation).

The driver re-engagement assessment system 80 may include a scene evaluation module 82, a test selection module 84, a test execution module 86, and a test evaluation module 88. The modules 82, 84, 86, 88 may comprise one or more software applications that may be stored in the storage medium 38 and executed by the processor 36 of the controller 34. In one embodiment, the controller 34 may be a dedicated controller, or is at least part of, the assessment system 80.

The assessment system 80 may further include the occupant interface 54, the steering wheel position sensor 42, and the sensors 56. The occupant interface 54 and the sensors 56 may also function as part of the automated guidance system 50. The steering wheel position sensor 42 may also function as part of, or generally serves, the steering device 26. In another embodiment, the assessment system 80 may include a dedicated occupant interface, and/or the steering wheel position sensor 42 may be dedicated toward the assessment system 80.

Figure 4:
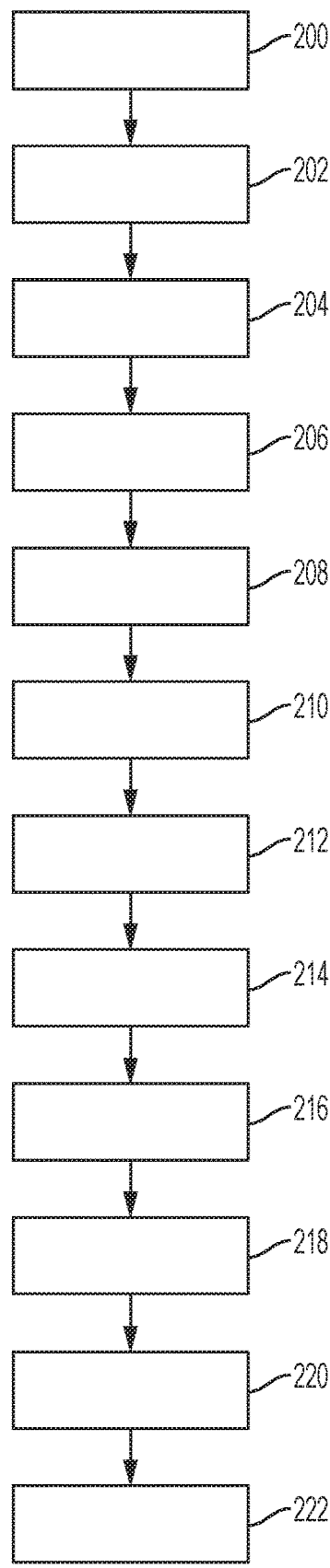
FIG. 4 is a flow chart of a method of operating the driver re-engagement assessment system.

Referring to FIGS. 3 and 4 a method of operating the driver re-engagement assessment system 80 may include at block 200, a means to direct the host vehicle 20 by an occupant 62 to release control of the vehicle to the occupant. In one embodiment, the user interface 54 may be the means for the occupant 62 to provide this directive 60. For example, the occupant directive 60 may be a verbal request where the user interface 54 includes a microphone. Alternatively, the occupant 62 may simply enter the manual operation directive onto a touch screen of the user interface 54. In yet another embodiment, the user interface 54 may generally be integrated into the steering device 26, and the act of pulling the steering wheel 40 out from a stowed position, or the act of rotating the steering wheel, generates the manual operation directive 60.

At block 202, the user interface 54 may output a manual operation directive signal 66 to the scene evaluation module 82 and/or the test selection module 84. At block 204 and upon the module 82 receiving the manual directive signal 66 (or otherwise being directed to do so), the scene evaluation module 82 may receive a signal 68 from at least one scene detection sensor 56. At block 206, the scene evaluation module 82 may categorize the scene into one of a plurality of pre-programmed scenes established as pre-programmed data 90 that may be stored in the storage medium 38 of the controller 34. For example, the scene signal 68 may be categorized as a curved road, a straight road, an ascending road, a declining road, and other categories. The scene category data 90 may include tolerances that the scene evaluation module 82 applies to determine best-fit for each scene category.

At block 208, the test selection module 84 may receive the selected scene category (see arrow 92 in FIG. 3) from the scene evaluation module 82. At block 210, the test selection module 84 may select a test from a plurality of pre-programmed tests, and based on the selected scene category. For example, if the selected scene category is a straight road, the selected test may be a change lane test that requires the occupant 62 to use the steering device 26. As another example, if the selected scene category is a curved road, the selected test may be a stay in lane test that may also require the occupant 62 to utilize the steering device 26. As yet another example, if the selected scene category is an ascending road, the selected test may be a first maintain vehicle speed test that requires the occupant 62 to utilize the acceleration device 30, and if the selected scene category is a descending road, the selected test may be a second maintain vehicle speed test that requires the occupant 62 to utilize the brake device 28. The plurality of pre-programmed tests may generally be a pre-programmed data file 94 retrievably stored in the storage medium 38 of the controller 34.

At block 212, the test execution module 86 may receive the selected test (see arrow 96 in FIG. 3) from the test selection module 84. At block 214 and in response to receipt of the selected test 96 from the data file 94, the test execution module 86 may send a notification signal (see arrow 98 in FIG. 3) to the user interface 54 for communication with the occupant 62. The notification signal 98 may be associated with a notification to the occupant 62 that a test shall commence and may include the type of test and/or appropriate instructions that the occupant 62 must follow to pass the selected test 96. For example, the notification signal 98 may be a request directed to the occupant 62 to change lanes.

At block 216 and dependent upon the selected test 96, one or more of the steering, brake, and acceleration devices 26, 28, 30, or other similar devices used to operate/control the host vehicle 20, may receive a test command signal 70. The test command signal 70 may be associated with the selected test 96, and may function to assure host vehicle safety in the event the occupant is not prepared to assume manual control. The test command signal 70 may further command one of the steering device 26, the brake device 28, and the acceleration device 30 to follow through with the test objective should the occupant fail, and/or detect/sense vehicle maneuvers performed by the occupant 62 as part of the selected test 96.

At block 218, the specific device 26, 28, 30 (i.e., X-by-wire device) that receives the test command signal 70 may generally respond by performing a task associated with the selected test 96. In one example, this task may be a deviation from what the host vehicle 20 may normally do when in the autonomous mode for the purpose of determining if the occupant corrects this deviation during the selected test. At block 220 and during execution of the selected test 96, one or more of a plurality of sensors 42, 46, 56 and/or others, may send an occupant performance signal 100 to the test evaluation module 88. Alternatively, the occupant performance signal 100 may be sent to the test execution module 86, which may then compile the signals 100 and send a performance report 102 to the test evaluation module 88.

At block 222, the test evaluation module 88 may apply a test data file 104 associated with the selected test 96 to determine if the occupant 62 passed or failed the test. If the occupant 62 passes the selected test, the occupant is granted manual control of the host vehicle. If the occupant 62 fails the selected test 96, the host vehicle 20 denies granting manual control. The results of the selected test 96 may be reported to the occupant 62 via the user interface 54. The test data file 104 may, at least in-part, be pre-programmed into the storage medium 38 of the controller 34. Alternatively, or in addition too, the test data file 104 may also be generated in real-time by the automated guidance system 50 that inputs associated data into the test evaluation module 88. For example, the automated guidance system 50 may determine real-time road conditions that may influence the test results.

Figure 5:
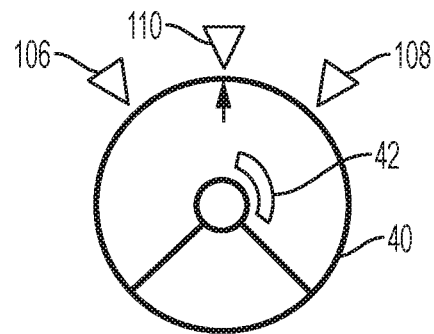
FIG. 5 is a plan view of a steering wheel of the host vehicle.
Figure 6:
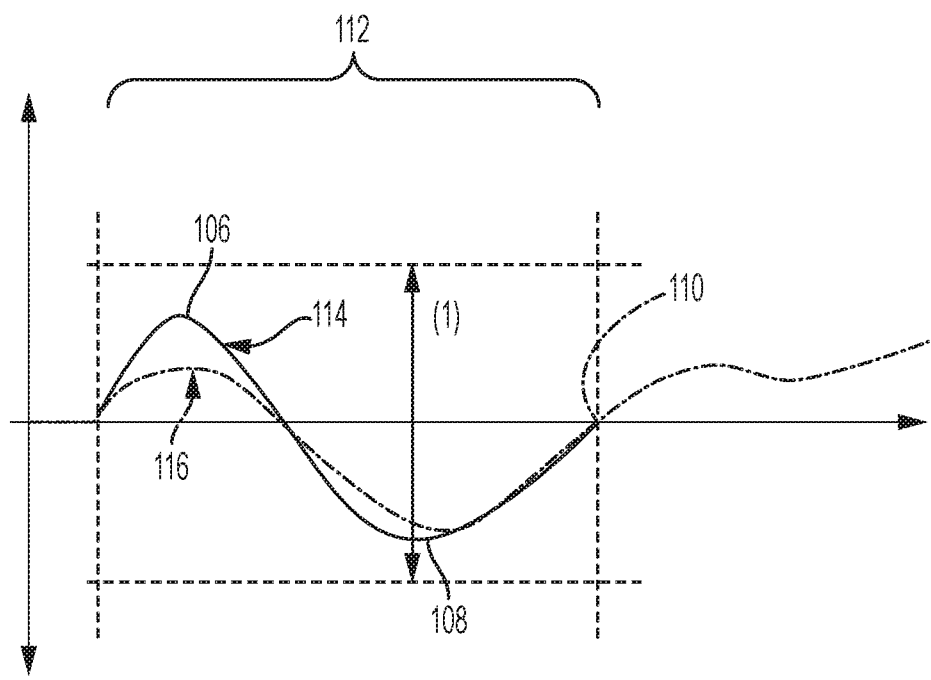
FIG. 6 is a graph illustrating test data utilized by the driver re-engagement assessment system.

In one example, the selected test 96 may be a lane change test. In this example, the command signal 70 may then be sent to the steering device 26. As best shown in FIGS. 5 and 6, the lane change test 96 may entail one or more steering wheel positions (i.e., three illustrated as 106, 108, 110. The first position 106 (e.g., about 10 o'clock position) is the expected steering wheel position contained in the test data file 104 and associated with what is expected while the occupant 62 initiates the lane change. The second wheel position (e.g., about 2 o'clock position) is the expected steering wheel position contained in the test data file 104 and associated with what is expected while the occupant nears completion of the lane change. The third wheel position (e.g., about 12 o'clock) is the final wheel position contained in the test data file 104 and associated with what is expected upon completion of test and for the occupant to remain in the lane. In this example, and with the wheel at about 12 o'clock for the third position, the road (i.e., or lane) is expected to be straight.

Referring to FIG. 6 and with continued reference to the lane change test 96 example, the test data file 104 may generally comprise a graph having an x-axis representing time and a y-axis represent a steering wheel position with the y-axis origin representing the third position 110 (i.e., 12 o'clock position). The duration of the lane change test 96 may be expected to last over a time span 112. The curve 114 represents a test case target, and the curve 116 represents the position of the steering wheel 40 measured by the steering wheel position sensor 42 at a moment in time. The test evaluation module 88 may be configured to assure the curve 116 is within a prescribed tolerance of the curve 114. If curve 116 falls appreciably outside of, or away from, the expected curve 114, then the test evaluation module 88 may conclude that the occupant 62 has failed the test.

It is understood and contemplated that while the host vehicle 20 is in the autonomous mode, the steering wheel 40 of the steering device 26, which may be a steer-by-wire assembly, does not rotate as the angle of the road wheels 22 change to maneuver the host vehicle 20. That is, the steering wheel 40 may not be, or is not always, directly linked to the angular displacement of the road wheels 22.

In another embodiment, the selected test 96 may include a haptic shared control. That is, and in one example, the command signal 70 may be sent to the steering device 26 and may affect steering torque. As part of the selected test 96 the occupant 62 may be expected to overcome the additional torque produced by the steering device 26 and per command 70. The steering torque sensor 46 may be utilized to output the test performance signal 100.

In another embodiment, the quality of the driver steering input may vary. A haptic feedback by the steering wheel 40 and/or user interface 54 may notify the driver to improve during the test. That is, the user interface 54 may generate a manual operation directive in response to a driver input. Steer-by-wire in this instance is an enabler since driver input can be evaluated, and/or a haptic signal can be sent to the driver independent of the actual direction of the steering system.

Advantages and benefits of the present disclosure include an efficient and safe means of transitioning a vehicle from autonomous operation to manual operation where an occupant may assume control of the vehicle. Other advantages may include a test that progressively verifies the readiness of an occupant to assume vehicle control via the performance of test actions appropriate with the current use of the host vehicle. Moreover, the test applied by the host vehicle during the transition phase may be relatively comfortable, intuitive and/or entertaining for the occupant.

The various functions described above may be implemented or supported by a computer program that is formed from computer readable program codes, and that is embodied in a computer readable medium. Computer readable program codes may include source codes, object codes, executable codes, and others. Computer readable mediums may be any type of media capable of being accessed by a computer, and may include Read Only Memory (ROM), Random Access Memory (RAM), a hard disk drive, a compact disc (CD), a digital video disc (DVD), or other forms.

Terms used herein such as component, application, module, system, and the like are intended to refer to a computer-related entity, either hardware, a combination of hardware and software, or software execution. By way of example, an application may be, but is not limited to, a process running on a processor, a processor, an object, an executable, a thread of execution, a program, and/or a computer. It is understood that an application running on a server and the server, may be a component. One or more applications may reside within a process and/or thread of execution and an application may be localized on one computer and/or distributed between two or more computers.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

Having thus described the invention, it is claimed:

1. A driver re-engagement assessment system including an X-by-wire device adapted for both manual control and automated control of a vehicle, the driver re-engagement assessment system comprising:
   a controller including an electronic processor and a storage medium;
   a user interface configured to output an occupant directive signal for manual control to the controller;
   a test execution module executed by the electronic processor upon controller receipt of the occupant directive signal, and initiate a re-engagement test; and
   a test evaluation module executed by the electronic processor, and configured to receive an occupant performance signal indicative of occupant performance during the re-engagement test, and evaluate the occupant performance signal to determine a test pass result and a test fail result, manual control of the vehicle being enabled upon the determination of the test pass result.

2. The driver re-engagement assessment system set forth is claim 1, wherein the occupant performance signal is received from the X-by-wire device.

3. The driver re-engagement assessment system set forth in claim 2, wherein the X-by-wire device is a steering device including a steering wheel position sensor configured to output the occupant performance signal.

4. The driver re-engagement assessment system set forth in claim 2, wherein the X-by-wire device is an acceleration device.

5. The driver re-engagement assessment system set forth in claim 2, wherein the X-by-wire device is a brake device.

6. The driver re-engagement assessment system set forth in claim 2, wherein the test execution module is configured to send a test command signal to the X-by-wire device to enable occupant participation in the re-engagement test.

7. The driver re-engagement assessment system set forth in claim 6, wherein the test execution module is configured to send a notification signal to the user interface to instruct the occupant about the re-engagement test.

8. The driver re-engagement assessment system set forth in claim 1, further comprising:
   a test selection module executed by the electronic processor and configured to select between a plurality of tests to be executed by the test execution module and dependent upon a plurality of scene categories, wherein the re-engagement test is a selected test from the plurality of tests.

9. The driver re-engagement assessment system set forth in claim 8, wherein the plurality of tests are pre-programmed into the storage medium.

10. The driver re-engagement assessment system set forth in claim 8, further comprising:
    a scene evaluation module executed by the electronic processor and configured to receive a scene signal, determine a selected scene category from a plurality of scene categories indicative of the scene signal, and output the selected scene category to the test selection module, wherein the selected test is determined from the selected scene category.

11. The driver re-engagement assessment system set forth in claim 10, wherein the plurality of scene categories are pre-programmed into the storage medium.

12. The driver re-engagement assessment system set forth in claim 11, wherein the plurality of scene categories include a straight road and a curved road.

13. The driver re-engagement assessment system set forth in claim 1, wherein the X-by-wire device is a steering device including a steering wheel and a steering wheel position sensor configured to output the occupant performance signal, and the test execution module is configured to send a notification signal to the user interface indicative of instructing the occupant to directionally maneuver the host vehicle as part of the re-engagement test.

14. The driver re-engagement assessment system set forth in claim 13, wherein the steering wheel does not automatically rotate when the automated guidance system is operating in an automated mode.

15. The driver re-engagement assessment system set forth in claim 13, wherein the notification signal in indicative of instructing the occupant to make a lane change.

16. The driver re-engagement assessment system set forth in claim 15, wherein the notification signal is indicative of instructing the occupant to place the steering wheel in a plurality of consecutive steering wheel positions that simulate the lane change.

17. The driver re-engagement assessment system set forth in claim 16 wherein the test evaluation module applies a test data file to evaluate the test performance signal.

18. A method of operating a driver re-engagement assessment system of an autonomous vehicle, the method comprising:
    generating a manual operation directive signal by a user interface in response to an occupant directive;

receiving the manual operation directive signal by a controller;

initiating a test execution module executed by the controller, and upon receipt of the manual operation directive signal;

sending a notification signal to the user interface instructing about an impending re-engagement test;

sending a test command signal by the test execution module to an X-by-wire device;

performing a function by the X-by-wire device associated with the re-engagement test;

sending an occupant performance signal to a test evaluation module executed by the controller; and evaluating the occupant performance signal by the test evaluation module.

19. The method set forth in claim 18, wherein the x-by-wire device is a steering device and the occupant performance signal is generated by a steering wheel position sensor.

\* \* \* \* \*